(12) United States Patent
Lynch et al.

(10) Patent No.: US 7,533,174 B1
(45) Date of Patent: May 12, 2009

(54) MEDIA GATEWAY CONNECTION INFORMATION RECOVERY

(75) Inventors: John C. Lynch, Belleville (CA); Pierre Couillaud, Belleville (CA); Metodej E. Valentik, Belleville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1629 days.

(21) Appl. No.: 09/672,821

(22) Filed: Sep. 29, 2000

(51) Int. Cl.
*G06F 15/16* (2006.01)
*H04M 1/24* (2006.01)

(52) U.S. Cl. .................................. 709/227; 379/9.05

(58) Field of Classification Search ................ 709/203, 709/217, 219, 220, 223, 227, 229; 379/9.05, 379/9.04, 221.03, 221.04, 221.05, 2, 11, 379/900; 370/352, 216–219
See application file for complete search history.

(56) References Cited

U.S. PATENT DOCUMENTS

| | | | | |
|---|---|---|---|---|
| 5,430,709 A * | 7/1995 | Galloway | .................... | 370/241 |
| 5,473,599 A | 12/1995 | Li et al. | .................... | 370/16 |
| 5,812,748 A * | 9/1998 | Ohran et al. | .................... | 714/4 |
| 5,848,128 A * | 12/1998 | Frey | .................... | 379/9 |
| 5,933,474 A * | 8/1999 | Kipp | .................... | 379/9.05 |
| 5,974,114 A * | 10/1999 | Blum et al. | .................... | 379/9 |
| 6,161,111 A * | 12/2000 | Mutalik et al. | .................... | 707/205 |
| 6,205,557 B1 * | 3/2001 | Chong et al. | .................... | 714/4 |
| 6,289,001 B1 * | 9/2001 | Smyk | .................... | 370/216 |
| 6,360,330 B1 * | 3/2002 | Mutalik et al. | .................... | 714/4 |
| 6,363,065 B1 * | 3/2002 | Thornton et al. | .................... | 370/352 |
| 6,377,570 B1 * | 4/2002 | Vaziri et al. | .................... | 370/352 |
| 6,393,481 B1 * | 5/2002 | Deo et al. | .................... | 709/224 |
| 6,424,700 B1 * | 7/2002 | Thibon et al. | .................... | 379/32.04 |
| 6,570,855 B1 * | 5/2003 | Kung et al. | .................... | 370/237 |
| 6,584,186 B1 * | 6/2003 | Aravamudan et al. | .. | 379/201.03 |
| 6,671,262 B1 * | 12/2003 | Kung et al. | .................... | 370/260 |
| 6,674,713 B1 * | 1/2004 | Berg et al. | .................... | 370/217 |
| 6,680,952 B1 * | 1/2004 | Berg et al. | .................... | 370/467 |
| 6,724,747 B1 * | 4/2004 | Arango et al. | .................... | 370/352 |
| 6,735,175 B1 * | 5/2004 | Havens | .................... | 370/236 |
| 6,754,180 B1 * | 6/2004 | Christie | .................... | 370/236 |
| 6,760,324 B1 * | 7/2004 | Scott et al. | .................... | 370/352 |
| 6,775,267 B1 * | 8/2004 | Kung et al. | .................... | 370/352 |
| 6,778,494 B1 * | 8/2004 | Mauger | .................... | 370/230 |

(Continued)

FOREIGN PATENT DOCUMENTS

WO WO 0217038 A2 * 2/2002

(Continued)

*Primary Examiner*—William C Vaughn, Jr.
*Assistant Examiner*—Yemane Mesfin
(74) *Attorney, Agent, or Firm*—Withrow & Terranova, P.L.L.C.

(57) ABSTRACT

In a packet-based telephony network, a media gateway provides information on active media path connections to an active call server. For instance, this data may be provided to a backup call server to keep the backup call server in a warm standby mode. The backup call server polls a media gateway to retrieve a table of information on active media path connections. The polling may be done periodically or only during switchover from the active call server to the backup call server. After switchover, the backup call server has all necessary details about active media path connections to provide accurate billing information. Alternatively, after a temporary failure at the active call server, the active call server may send a request to the media gateway to retrieve a table of information on active media path connections.

23 Claims, 5 Drawing Sheets

U.S. PATENT DOCUMENTS 6,799,210 B1 * 9/2004 Gentry et al. ................ 709/223
6,832,254 B1 * 12/2004 Scoggins et al. ............ 709/227
6,917,610 B1 * 7/2005 Kung et al. .................. 370/352
6,992,974 B1 * 1/2006 Tripathi ....................... 370/216

FOREIGN PATENT DOCUMENTS

WO    WO 0221859 A1 * 3/2002

* cited by examiner

FIG. 4

| FIG. 4B |
| --- |
| FIG. 4A |

| CALLED IP ADDRESS | CALLING IP ADDRESS | CALL REFERENCE NUMBER | CALLED NUMBER | CALLING NUMBER | QUALITY OF SERVICE |
| --- | --- | --- | --- | --- | --- |
| 10.0.0.1 | 10.0.0.4 | 123456 | (416)967-1111 | (905)738-5194 | MAXIMIZE RELIABILITY |
| 192.68.0.1 | 49.63.35.7 | 456789 | (416)555-1234 | (416)555-5678 | MINIMIZE DELAY |
| 24.48.16.2 | 27.45.162.9 | 718293 | (416)555-9874 | (416)555-5632 | MINIMIZE COST |

| TYPE OF CALL (CODING ALGORITHM) | TIME CALL HAS BEEN ACTIVE | NUMBER OF PACKETS SENT | NUMBER OF PACKETS RECEIVED | LOST PACKETS (PERCENT) |
|---|---|---|---|---|
| VOICE (G.711) | 01:15:03.34 | 69,671,111 | 69,531,769 | 0.2% |
| VIDEO (H.261) | 00:28:36.29 | 165,551,234 | 164,889,029 | 0.4% |
| FAX (TIFF) | 00:06:54.78 | 559,874 | 554,275 | 1.0% |

FIG. 4B

MEDIA GATEWAY CONNECTION INFORMATION RECOVERY

FIELD OF THE INVENTION

The present invention relates to media connections over data networks and, more particularly, to recovery, from media gateways, of connection information.

BACKGROUND OF THE INVENTION

Increasingly, the Internet and other packet-based networks are being employed to provide telephony services ranging from a simple voice call between two parties to complex video conferencing between multiple geographically distant parties.

In a typical packet-based telephony session, a party at one endpoint (a calling telephone) picks up a handset (or otherwise causes the calling telephone to go "off-hook") and enters a destination number for another endpoint (a called telephone). The off-hook condition of the calling telephone is sensed by a local media gateway that is connected to a packet-based data network. The entered destination number is passed over the data network from the local media gateway to a call server (which may also be called a connection manager) that supports the local media gateway. The local media gateway is effectively a "dumb slave" device under control of the call server. After consulting a table that associates destination numbers with data network addresses, the call server communicates over the data network with a remote media gateway associated with the called telephone and instructs the remote media gateway to cause the called telephone to ring. If the remote media gateway reports back to the call server success in causing the called telephone to ring, the call server instructs the local media gateway to play a ring tone on the calling telephone. The call server subsequently sends signaling to the data network to set up a call path (generically, a media path) between the local media gateway and the remote media gateway to carry bi-directional data traffic between the calling telephone and the called telephone.

If the called telephone is answered, the call path through the data network (established by call server signaling) may be activated. Once the call path has been activated, communication between either of the media gateways and the call server is generally not required until the call is complete and each of the telephones is returned to an "on-hook" condition. Upon the completion of a call, the call server receives an indication of the completion from each of the media gateways. As the call server has a record of the time of the beginning of the call and the end of the call, a complete record of the call may then be saved. Such a record of the call may also include an indication of the Quality of Service provided as well as other parameters related to the call path. Subsequently, the call server sends signaling to the data network to tear down the call path.

Data networking equipment for packet-based telephony can be expensive, not to mention time consuming to maintain. As such, packet-based telephony service providers fill a role by providing packet-based telephony to individuals or enterprises. These service providers typically bill their customers on a per-call basis and, therefore, it is important to the service providers that an accurate record of each call be maintained.

To build a reliable packet-based telephony network, it is desirable to include a backup call server. The backup call server may be used when an active call server fails or when network failure causes the active call server to be unreachable by its supported media gateways at the end of a call, which is when the indication of completion of a call is typically sent from a media gateway to the call server supporting the media gateway.

In some present architectures for telephony over packet networks, when a media gateway cannot communicate with its active call server, control of the media gateway may be switched over to the backup call server. Any calls in progress before the switchover can remain active after the switchover. However, at the end of a call whose control has been switched, the backup call server may not have a record of the beginning the call and therefore may not be able to provide an accurate record of the call for accounting and billing. For service providers that generate revenue on a per call basis, such lost, or inaccurate, records can result in lost revenue.

In a typical solution to this problem, the active call server passes information to the backup call server, typically using a proprietary communications protocol, thus keeping the backup call server updated with information about active calls. However, the performance requirements on the active call server are significant, as much of the communication between the active call server and each media gateway must be repeated to the backup call server. As well, there is a need, in this solution, to maintain a reliable link from the active call server to the backup call server and refresh lost information should the backup call server briefly disconnect from the active call server. It is generally necessary in this solution that the version of call server software at both the active and backup call servers be equivalent to allow for proper inter-working. This also means that the timing of upgrades to the software may be complex.

SUMMARY OF THE INVENTION

In a packet-based telephony network, a call server requests information about active media connections from an intelligent media gateway. In particular, this information may be requested by a backup call server to keep the backup call server in a warm standby mode. The backup call server may poll intelligent media gateways to aid in collection of data used to construct a table of information on active media path connections. The polling may be done periodically or only during switchover. After switchover, the backup call server has all necessary details about active media path connections to provide accurate billing information. Additionally, an active call server may recover from a failure by requesting information about active media connections from associated intelligent media gateways.

Advantageously, the performance requirements of the active call server, necessary to maintain a backup call server, are reduced relative to the solution wherein the active call server passes to the backup server each communication from each media gateway. This reduction in performance requirements at the active call server allows for a higher performance packet-based telephony network. This approach is simpler to implement than existing solutions for maintaining a backup call server as there is no co-ordination required between call servers. Further, both inter-working between various software versions of call servers and software upgrades are simplified.

In accordance with an aspect of the present invention there is provided, at a call server in a packet-based telephony network, a method of maintaining a record of an active media connection including sending a request, to a media gateway, for information regarding the active media connection and receiving the information. In another aspect of the invention a call server is provided for performing this method. In a further aspect of the present invention, there is provided a software medium that permits a general purpose computer to carry out this method.

In accordance with another aspect of the present invention there is provided, at a backup call server in a packet-based telephony network, a method of acquiring a record of an active media connection including receiving an indication of a failure of a primary call server, the primary call server, prior to the failure, supporting the active media connection and, responsive to the receiving, sending a request, to a media gateway, for information regarding the active media connection and receiving the information.

In accordance with a further aspect of the present invention there is provided, at a media gateway in a packet-based telephony network, a method of providing a record of an active media connection including receiving, from a call server, a request for information regarding the active media connection and responsive to the request, transmitting information regarding the active media connection to the call server. In another aspect of the invention a media gateway is provided for performing this method. In a further aspect of the present invention, there is provided a software medium that permits a general purpose computer to carry out this method.

In accordance with a still further aspect of the present invention there is provided a packet-based telephony network system including a packet based data network, a telephone station apparatus, a media gateway communicatively connected to the telephone station apparatus and the data network, a primary call server communicatively connected, over the data network, to the media gateway. The packet-based telephony network system also includes a backup call server communicatively connected, over the data network, to the media gateway and operable to send a request, to the media gateway, for information regarding an active media connection terminated at the primary server and receive the information.

In accordance with another aspect of the present invention there is provided a computer data signal embodied in a carrier wave including a request for information regarding an active media connection.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 4 illustrates a table of information on active media path connections in accordance with an embodiment of the present invention.

DETAILED DESCRIPTION

Figure 1:
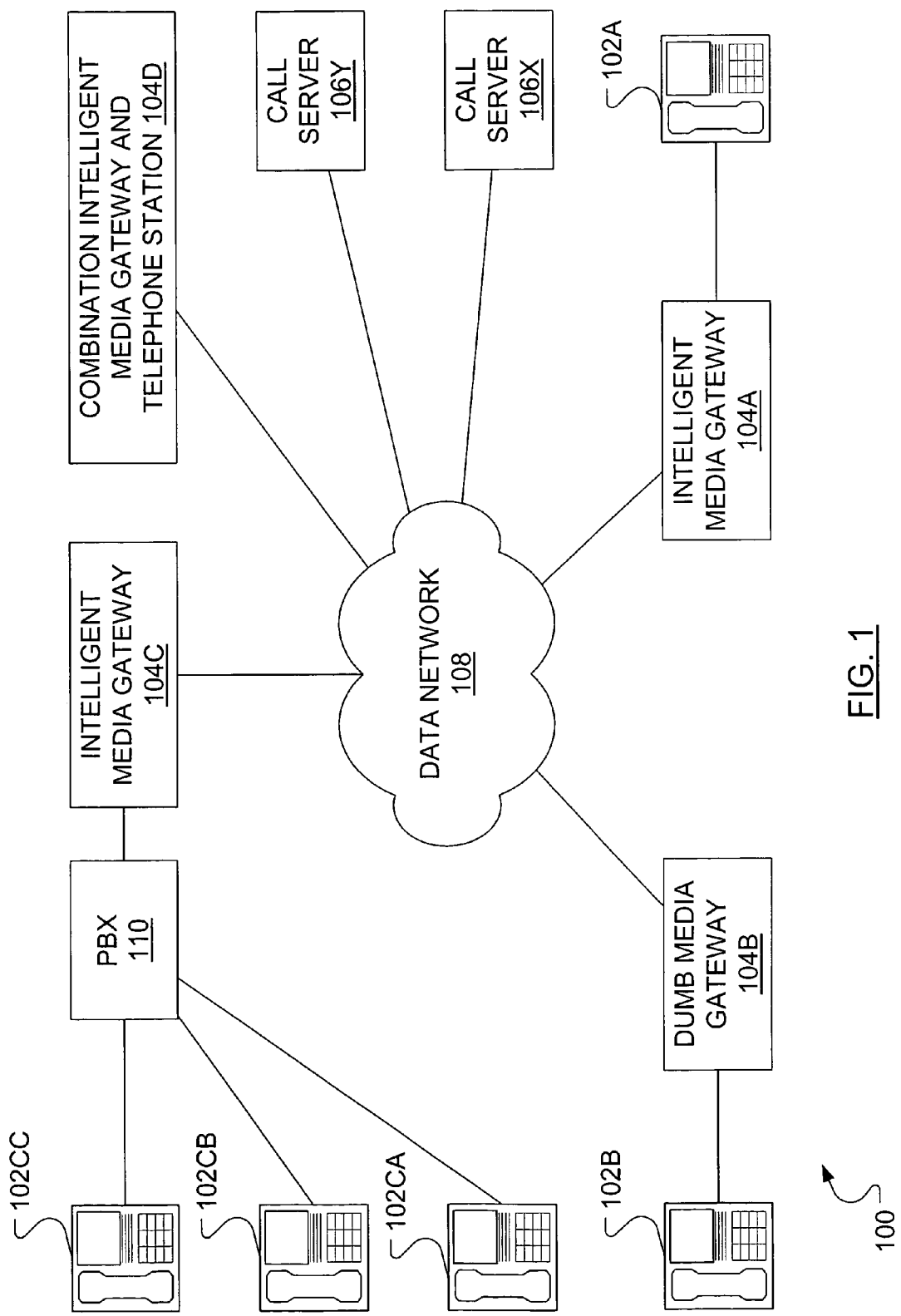
FIG. 1 schematically illustrates a packet-based telephony network in which the present invention may be used.

Illustrated in FIG. 1 is a packet-based telephony network system 100 including a number of media gateways 104A, 104B, 104C, 104D (referenced collectively as 104), a first call server 106X and a second call server 106Y, all connected to a data network 108. Media gateway 104B is a typical media gateway and, compared to the "intelligent" media gateways 104A, 104C and 104D which employ an embodiment of the present invention, may be called a dumb media gateway. The media gateways 104 allow connections to be set up between endpoints. Connected to the intelligent media gateway 104A is a telephone station apparatus 102A; while connected to the dumb media gateway 104B is a telephone station apparatus 102B. A telephone station apparatus 102CA, along with the telephone station apparatus 102CB and 102CC, is connected to a private branch exchange (PBX) 110, which is connected to the media gateway 104C.

Figure 2:
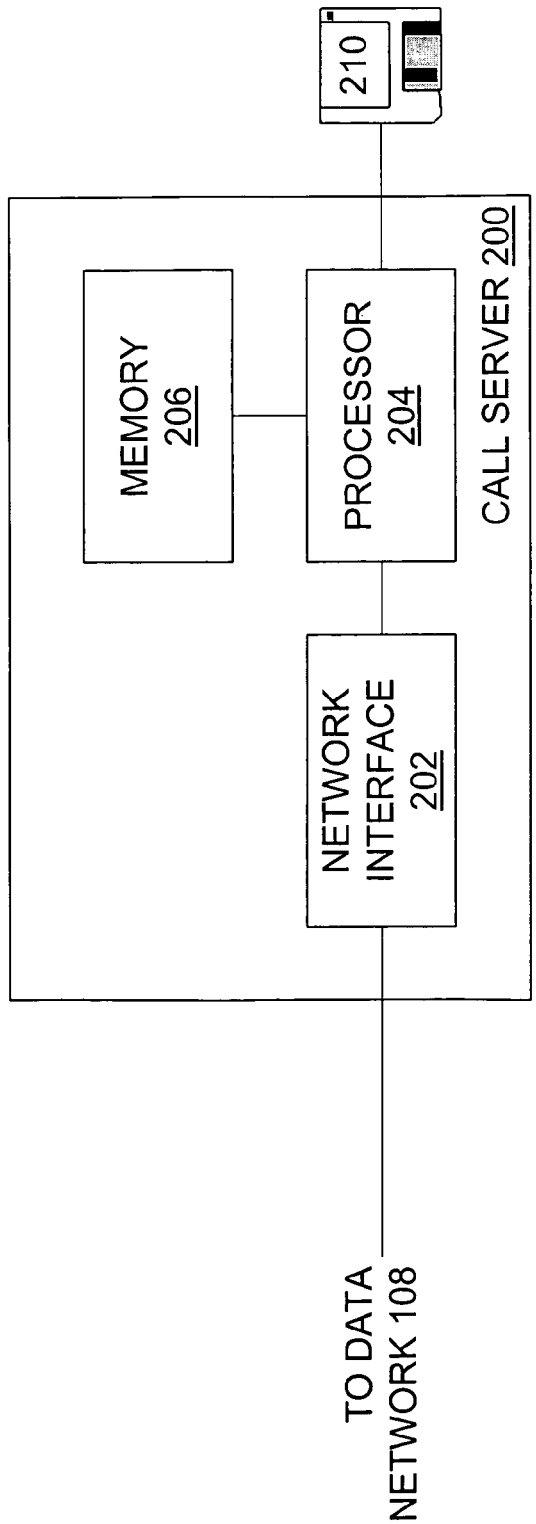
FIG. 2 illustrates a call server in accordance with an embodiment of the present invention.

FIG. 2 illustrates a call server 200 suitable for use in the packet-based telephony network system 100 of FIG. 1. The call server 200 includes a network interface 202 for connecting the call server 200 to the data network 108 (FIG. 1), a processor 204 and a memory 206. The processor 204 may be loaded with call server software for executing methods exemplary of an embodiment of the present invention from a software medium 210 that could be a disk, a tape, a chip or a random access memory containing a file downloaded from a remote source.

Figure 3:
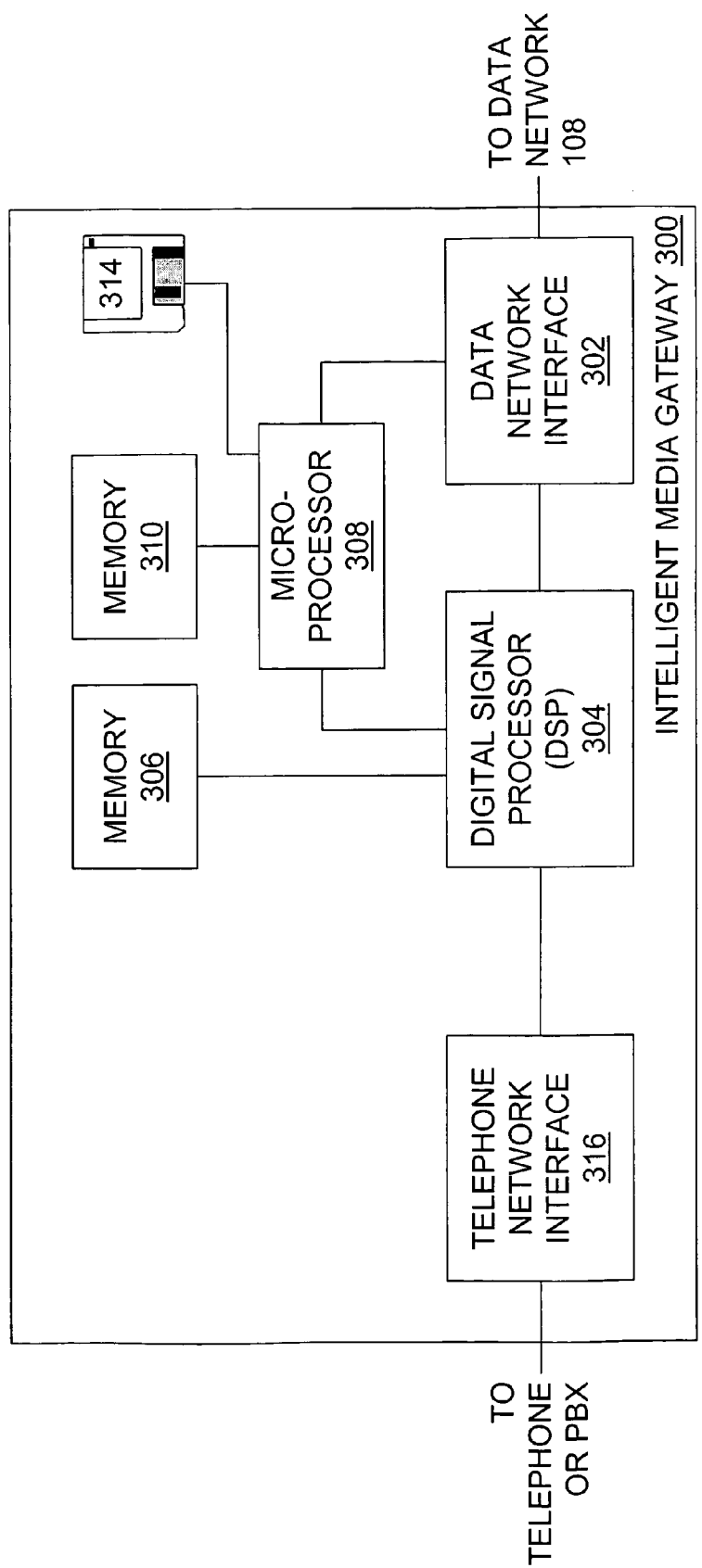
FIG. 3 illustrates an intelligent media gateway in accordance with an embodiment of the present invention.

Turning to FIG. 3, an intelligent media gateway 300 is illustrated which is suitable for use in the packet-based telephony network system 100 of FIG. 1. The intelligent media gateway 300 includes a telephone network interface 316 for connecting the intelligent media gateway 300 to a telephone station apparatus either directly or through a PBX and a data network interface 302 for connecting the intelligent media gateway 300 to the data network 108 (FIG. 1). Further included in intelligent media gateway 300, and connected to both the data network interface 302 and the telephone network interface 316, is a digital signal processor (DSP) 304 with an associated memory 306. A microprocessor 308 has an associated memory 310 and connects to the digital signal processor 304 and the data network interface 302. The microprocessor 308 may be loaded with media gateway software for executing methods exemplary of an embodiment of the present invention from an associated software medium 314. The media gateway software media 314 could be disk, tape, chip or random access memory containing a file downloaded from a remote source.

In overview, the intelligent media gateway 104A maintains a table of information on active media path connections. Upon request, this information may be provided to a call server. There are a number of scenarios wherein this information may be of use to a call server. In a backup scenario, the second call server 106Y may be configured as a backup for the first call server 106X. Periodic polling of the intelligent media gateway 104A provides the second call server 106Y with an up-to-date record of active media connections such that, should the first call server 106X become unavailable to the intelligent media gateway 104A, the second call server 106Y may assume control of the active media connections at the intelligent media gateway 104A. In a recovery scenario, the first call server 106X may recover from a temporary failure by requesting, from the intelligent media gateway 104A, a table of information on active media path connections.

The backup scenario may transpire, in further detail, as follows. During a given active media path connection in progress between the telephone station apparatus 102A and the telephone station apparatus 102B, a network failure causes the active call server, say the first call server 106X, to be unreachable by the intelligent media gateway 104A. If the second call server 106Y has been configured as the backup call server for the first call server 106X, the intelligent media gateway 104A may switchover control of any calls in progress to the second call server 106Y. In its role as the backup call server for the first call server 106X, the second call server 106Y has periodically polled each of the media gateways 104 supported by the first call server 106X. In response to the polling, each of the media gateways 104, has provided, to the second call server 106Y, a table of information regarding ongoing connections. In particular, the intelligent media gateway 104A has provided information on the given active media path connection. Consequently, after switchover, the second call server 106Y has all the necessary details about the given active media path connection to save accurate billing information at the completion of the connection. From a performance requirement perspective, this backup scheme has little impact on the intelligent media gateway 104A and completely relieves the first call server 106X of any backup functions and consequential performance requirements.

If the intelligent media gateway 104A is configured to communicate with a call server that is identified by a Fully Qualified Domain Name (FQDN), rather than a network address, use of a Domain Name Server (DNS) may allow the switchover to be transparent from the perspective of the intelligent media gateway 104A. If the first (active) call server becomes unavailable, the DNS may alter the mapping of the FQDN from address of the first call server 106X to the address of the second call server 106Y. Alternatively, both the first call server 106X and the second call server 106Y may exist behind a router, where the intelligent media gateway 104A is configured to point to the network address of the router for call server service. The router then performs Network Address Translation (NAT) and passes communication from the intelligent media gateway 104A to the appropriate call server, either the active call server or the backup call server.

As will be apparent to a person skilled in the art, the above approach to call server backup is simpler to implement than existing solutions as there is no co-ordination required between call servers. An advantage of obviating the need for co-ordination between call servers is that one call server may backup another call server running a different version of operational software. Because of this allowance of version disparity, software upgrades need not be performed in parallel.

Preferably, a standards based interface and protocol are defined to allow a call server to request information from a media gateway. In one embodiment of the present invention, the data is requested from a media gateway through use of the Simple Network Management Protocol (SNMP). SNMP is a protocol for Internet network management services. It is formally specified in a series of related Internet Engineering Task Force (IETF) Request for Comment (RFC) documents. Network management, using SNMP, is performed on SNMP manageable entities. A collection of objects that describe an SNMP manageable entity is called a Management Information Base (MIB). Many MIBs have been defined for various network management services and yet more may be defined in future. Use of SNMP would enable wide spread deployment of the capability to provide information on active media connections to widely varied media gateway platforms. This technique could be employed in networks that use any of the current set of packet-based telephony network protocols (MGCP, MEGACO, SIP, H.323).

Using SNMP as an example, the second call server 106Y, acting as a backup call server, polls the intelligent media gateways 104A with a "getActiveConnection" MIB and receives in return a table of information on all active media connections in MIB format. From "Management Information Base for the Simple Network Management Protocol" draft-ietf-snmpv3-update-mib-03.txt, an exemplary MIB definition follows:

```
sysUpTime
    OBJECT-TYPE SYNTAX    TimeTicks
    MAX-ACCESS            read-only
    STATUS                current
    DESCRIPTION
        "The time (in hundredths of a second) since the
        network management portion of the system was last
        re-initialized."
    ::= { system 3 }
```

According to the present invention, each media gateway 104 has a record of calls in progress. An exemplary record 400 is illustrated in FIG. 4 and may include information such as: Called IP Address; Calling IP Address; Call Reference Number; Called Number; Calling Number; Quality of Service; Type Of Call (Coding Algorithm); Time Call Has Been Active; Number of Packets Sent; Number of Packets Received and a measure of Lost Packets (say, a percentage). The exemplary record 400 includes the Called Number and Calling Number, as well as a network address for identification of each of the destination and sending endpoints. Alternatively, much of the information that may be stored in the exemplary record 400 may be encoded in an "Intelligent Call ID." Such an Intelligent Call ID may include such information as: an indication of whether the call is incoming or outgoing at the particular endpoint; IP Address of the media gateway to which the endpoint connects; timeslot number; and a unique ID between 0 and FFFF. Where the timeslot number may be necessary when the data network 108, through which the media gateways 104 connect, uses time division multiplexing.

Alternate interfaces and protocols are available to allow a call server to request information from a media gateway through extensions to existing signaling protocols such as: MGCP; MEGACO; SIP; or H.323:

MGCP (Media Gateway Control Protocol) is an application programming interface and a corresponding protocol (MGCP) for controlling Voice over IP (VoIP) media gateways (such as the dumb media gateway 104B) from external call control elements (such as the call server 106Y). MGCP assumes a call control architecture where the call control "intelligence" is outside the media gateways and handled by external call control elements. For more information, see "Media Gateway Control Protocol (MGCP) Version 1.0" (IETF RFC 2705).

Megaco defines the protocols used between elements of a physically decomposed multimedia media gateway. There are no functional differences from a system view between a decomposed media gateway, with distributed sub-components potentially on more than one physical device, and a monolithic media gateway. For a general framework of these protocols, see "Megaco Protocol Version 0.8" (IETF RFC 2885).

The Session Initiation Protocol (SIP) is an application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these. SIP invitations used to create sessions carry session descriptions that allow participants to agree on a set of compatible media types. SIP supports user mobility by proxying and redirecting requests to the user's current location. Users can register their current location. SIP is not tied to any particular conference control protocol. SIP is designed to be independent of the lower-layer transport protocol and can be extended with additional capabilities. For more information, see "SIP: Session Initiation Protocol" (IETF RFC 2543).

In May 1996, the International Telecommunications Union Telecommunication Standardization Bureau (ITU-T) ratified a specification (H.323), which defines how voice, data, and video traffic will be transported over IP-based local area networks. The recommendation is based on the real-time protocol/real-time control protocol (RTP/RTCP) for managing audio and video signals.

Considering the intelligent media gateway 300 of FIG. 3, the telephone network interface 316 either connects directly to a telephone device or connects to a hub, such as a private branch exchange (PBX) 110, that connects to a number of telephone devices. As well, the signal arriving at the telephone network interface 316 may be analogue or digital. In either case, appropriate interfaces are well known in the art.

The DSP 304 functions to process voice signals received at the telephone network interface 316. This processing may include digitizing the voice signals, if the voice signals are not already digital signals. The processing may further include compressing the digital voice signals using one of many known audio compression standards, e.g., G.711, G.723 or G.729 from the ITU-T. The DSP 304 may also function to packetize the digital voice signals.

The microprocessor 308 functions to maintain active media connection information and provide this active media connection information to a call server on request. Necessarily, the microprocessor 308 can communicate with elements of the network using the appropriate signaling protocol. For instance, the microprocessor 308 may receive a request, via the data network interface 302, in SNMP format. In response, the microprocessor 308 may transmit a MIB.

Where the link from the intelligent media gateway 300 to the data network 108 comprises an Integrated Service Digital Network (ISDN) connection, the link may be considered to comprise channels for exchanging signaling (D-channels) and channels for transmitting and receiving media (B-channels). In such a case, the microprocessor 308 may perform the following two gateway functions: a Media Gateway function, having direct access and immediate control over B-channels and associated media channel features; and a Signaling Gateway function having direct access and control over D-channel Layer 1, the Signaling Gateway function may also process (i.e., terminate) signaling that uses the ISDN Layer 2 (i.e., Q.921) protocol. Alternatively, the intelligent media gateway 300 may communicate with the first call server 106X by transporting common channel signaling (CCS).

If the data network 108 (FIG. 1) is the Internet, or uses the Internet Protocol (IP), packets output from the intelligent media gateway 300 will have to conform to the Internet Protocol. Such conformation is typically provided by an "IP stack" processing. The IP stack processing may be implemented in the intelligent media gateway 300 in at least two schemes. In the first scheme, called software forwarding, the IP stack processing is performed by the microprocessor 308. Digital voice signals pass from the DSP 304 to the microprocessor 308 and, after some processing, IP packets are passed to the data network interface and subsequently to the data network 108. In the second scheme, called hardware forwarding, the IP stack processing is performed by the DSP 304. IP packets are created from the digital voice signals within the DSP 304 and passed directly to the data network interface 304, which forwards the IP packets on to the data network 108.

As will be appreciated, a single device may combine an intelligent media gateway, such as the intelligent media gateway 300 of FIG. 3, with a telephone station apparatus. Such a combination is provided in FIG. 1 as combination intelligent media gateway and telephone station 104D.

Other modifications will be apparent to those skilled in the art and, therefore, the invention is defined in the claims.

We claim:

1. At a call server in a packet-based telephony network, a method of maintaining a record of an active media connection comprising:
   sending a request, from the call server, to a media gateway, for information regarding said active media connection; and
   receiving said information at the call server.

2. The method of claim 1 wherein said sending comprises formulating said request using a network management protocol.

3. The method of claim 2 wherein said network management protocol is a Simple Network Management Protocol.

4. The method of claim 2 wherein said network management protocol is a Media Gateway Control Protocol.

5. The method of claim 2 wherein said network management protocol is a Session Initiation Protocol.

6. The method of claim 1 further comprising storing said received information in a memory.

7. The method of claim 1 further comprising repeating said sending at a predetermined interval.

8. The method of claim 1 wherein said received information includes an identification of a device originating said active media connection.

9. The method of claim 1 wherein said received information includes an indication of a duration of time said active media connection has been active.

10. The method of claim 1 wherein said received information includes an indication of a coding algorithm used for said active media connection.

11. The method of claim 1 wherein said received information includes an indication of Quality of Service setting associated with said active media connection.

12. A call server operable to:
    send a request, to a media gateway, for information regarding an active media connection; and
    receive said information at the call server.

13. A computer readable medium containing computer-executable instructions which, when performed by a processor in a call server in a packet-based telephony network, cause the processor to:
    send a request, from the call server to a media gateway, for information regarding an active media connection; and
    receive said information at the call server.

14. At a backup call server in a packet-based telephony network, a method of acquiring a record of an active media connection comprising:
    receiving an indication of a failure of a primary call server, said primary call server, prior to said failure, supporting said active media connection;
    responsive to said receiving, sending a request, from the backup call server to a media gateway, for information regarding said active media connection; and
    receiving said information at the backup call server.

15. At a media gateway in a packet-based telephony network, a method of providing a record of an active media connection comprising:

receiving, from a call server, a request for information regarding said active media connection; and responsive to said request, transmitting information regarding said active media connection to said call server.

16. The method of claim 15 wherein said request is received using a Simple Network Management Protocol.

17. The method of claim 15 wherein said transmitted information includes a network address of a device originating said active media connection.

18. The method of claim 15 wherein said transmitted information includes an indication of a duration of time said active media connection has been active.

19. The method of claim 15 wherein said transmitted information includes an indication of a coding algorithm used for said active media connection.

20. The method of claim 15 wherein said transmitted information includes an indication of Quality of Service setting associated with said active media connection.

21. A first media gateway comprising:

a receiver for receiving an incoming media flow;

a digital signal processor communicatively connected to said receiver for processing said media flow;

a transmitter communicatively connected to said digital signal processor for transmitting said media flow to a second media gateway; and a processor operable to:

receive, from a call server, a request for information regarding said media flow; and responsive to said request, transmit information regarding said media flow to said call server.

22. A computer readable medium containing computer-executable instructions which, when performed by a processor in a media gateway, cause the processor to:

receive, from a call server, a request for information regarding an active media connection; and responsive to said request, transmit information regarding said active media connection to said call server.

23. A packet-based telephony network system comprising:

a packet based data network;

a telephone station apparatus;

a media gateway communicatively connected to said telephone station apparatus and said data network;

a primary call server communicatively connected, over said data network, to said media gateway; and a backup call server communicatively connected, over said data network, to said media gateway and operable to:

send a request, to said media gateway, for information regarding an active media connection terminated at said primary server; and receive said information.

\* \* \* \* \*